(12) United States Patent
Welp et al.

(10) Patent No.: US 8,337,790 B2
(45) Date of Patent: Dec. 25, 2012

(54) SYSTEM AND METHOD FOR PURIFICATION OF FLUE GASES

(75) Inventors: Helmut Welp, Ochsenfurt (DE); Thomas Schmidt, Iphofen (DE)

(73) Assignee: Babcock Noell GmbH, Wuerzburg (DE)

( * ) Notice: Subject to any disclaimer, the term of this patent is extended or adjusted under 35 U.S.C. 154(b) by 268 days.

(21) Appl. No.: 12/798,580

(22) Filed: Apr. 7, 2010

(65) Prior Publication Data

US 2010/0221162 A1    Sep. 2, 2010

Related U.S. Application Data

(63) Continuation of application No. PCT/DE2008/001605, filed on Oct. 6, 2008.

(30) Foreign Application Priority Data

Oct. 23, 2007 (DE) .................. 10 2007 050 904

(51) Int. Cl.
*B01D 47/00* (2006.01)
*B01D 50/00* (2006.01)

(52) U.S. Cl. ........................ 423/210; 422/169

(58) Field of Classification Search .......... None
See application file for complete search history.

(56) References Cited

U.S. PATENT DOCUMENTS

| | | | |
|---|---|---|---|
| 2,080,779 A | 5/1937 | Lessing | |
| 3,961,018 A * | 6/1976 | Williamson | 423/228 |
| 4,263,021 A * | 4/1981 | Downs et al. | 95/224 |
| 4,340,572 A * | 7/1982 | Ben-Shmuel et al. | 423/243.08 |
| 4,687,649 A | 8/1987 | Kuroda et al. | |
| 5,084,255 A | 1/1992 | College et al. | |
| 5,213,782 A | 5/1993 | Moser et al. | |
| 5,308,509 A | 5/1994 | Bhat et al. | |
| 5,486,342 A * | 1/1996 | Moser et al. | 423/243.01 |
| 5,630,991 A | 5/1997 | Gal et al. | |
| 5,635,149 A * | 6/1997 | Klingspor et al. | 423/243.08 |
| 5,674,459 A | 10/1997 | Gohara et al. | |
| 5,779,999 A * | 7/1998 | Laslo | 423/210 |

(Continued)

FOREIGN PATENT DOCUMENTS

DE    29 39 744    4/1981

(Continued)

OTHER PUBLICATIONS

International Search Report of PCT/DE2008/001605.

*Primary Examiner* — Melvin C Mayes
*Assistant Examiner* — Sheng H Davis
(74) *Attorney, Agent, or Firm* — Collard & Roe, P.C.

(57) ABSTRACT

A method and system for purifying flue gases from power plants fired with fossil fuels has an absorber with at least one contact installation level arranged in an upper region, impinged with a suspension, and flowed through by untreated gas. The lower region has an absorption suspension sump, above which the inflow for the untreated gas is disposed. A separate reaction container includes two chambers separated by a partition wall with an overflow. The first chamber is connected with the sump, receives oxidation air, and has in a lower region an opening for discharging suspension. The second chamber is connected with a lime/limestone suspension container. A gas exhaust hood above the reaction container draws exhaust vapors into an exhaust vapor hood. A line for absorption suspension extends between at least one spraying level of the absorber and the reaction container, and a process water feed lies above the spraying level.

12 Claims, 1 Drawing Sheet

U.S. PATENT DOCUMENTS

| | | | |
|---|---|---|---|
| 5,787,821 A * | 8/1998 | Bhat et al. | 110/216 |
| 6,007,783 A * | 12/1999 | Ochi et al. | 422/171 |
| 6,110,256 A * | 8/2000 | Reynolds et al. | 95/4 |
| 7,722,843 B1 * | 5/2010 | Srinivasachar | 423/210 |
| 2005/0271569 A1 * | 12/2005 | Pehkonen et al. | 423/242.1 |

FOREIGN PATENT DOCUMENTS

| | | |
|---|---|---|
| DE | 31 36 155 | 4/1982 |
| DE | 269 893 | 7/1989 |
| DE | 289 211 | 4/1991 |
| DE | 43 31 415 | 3/1995 |
| DE | 10 2004 061 727 | 7/2005 |
| EP | 0 339 683 | 11/1989 |
| KR | 2001077204 * | 8/2001 |
| WO | WO 88/07023 | 9/1988 |

* cited by examiner

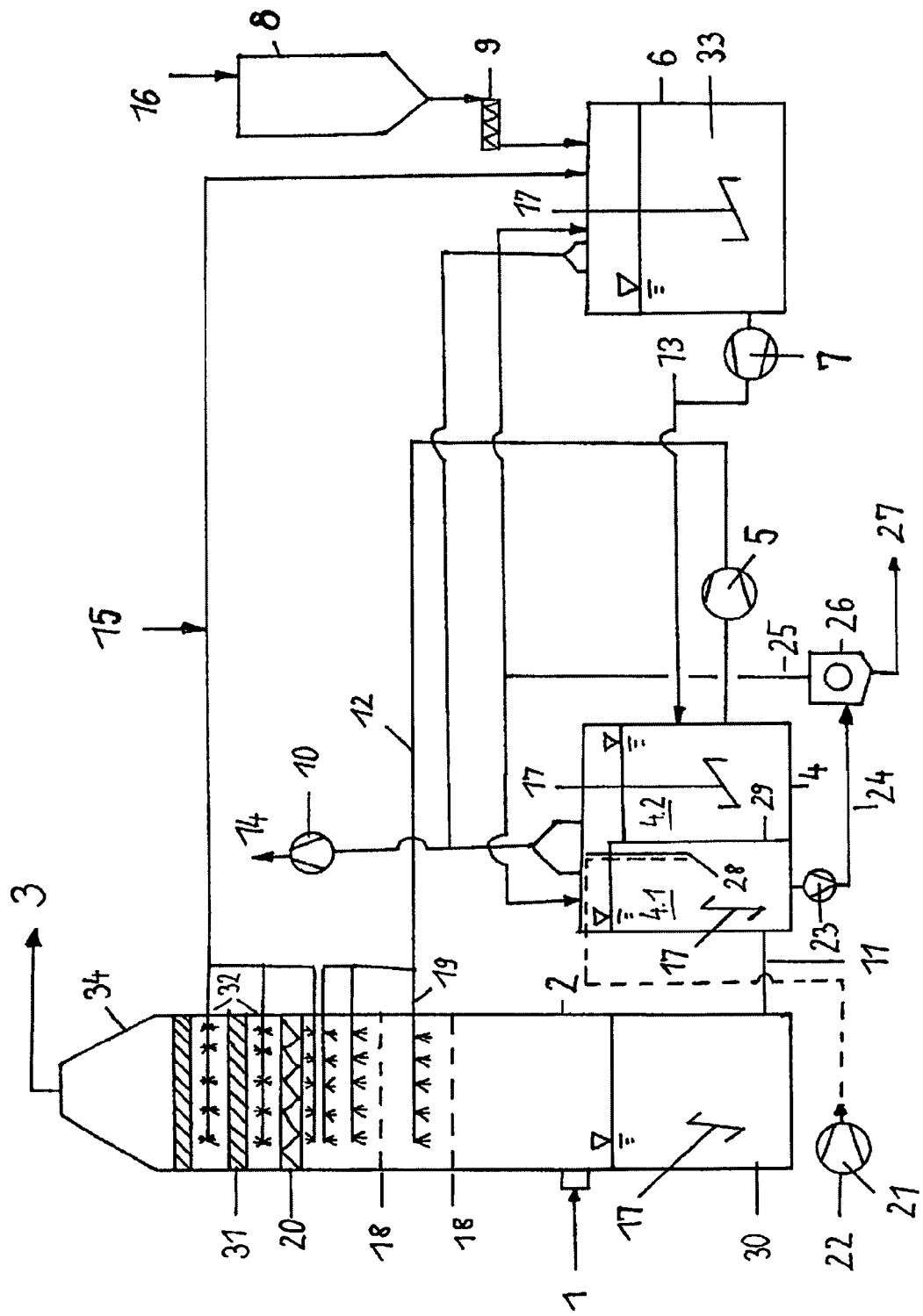

SYSTEM AND METHOD FOR PURIFICATION OF FLUE GASES

CROSS REFERENCE TO RELATED APPLICATIONS

Applicants claim priority under 35 U.S.C. §119 of German Application No. 10 2007 050 904.0 filed Oct. 23, 2007. Applicants also claim priority under 35 U.S.C. §120 of International Application No. PCT/DE2008/001605 filed Oct. 6, 2008. This application is a by-pass continuation application of said International Application No. PCT/DE2008/001605 filed Oct. 6, 2008. The International Application under PCT Article 21(2) was not published in English. The disclosure of the aforesaid International application and German application are incorporated by reference.

BACKGROUND OF THE INVENTION

1. Field of the Invention

The invention relates to a system and a method for purification of flue gases from power plants that work with fossil fuels, according to the oxyfuel process, and for retrofitting of power plants for preparation of the inclusion of a $CO_2$ absorption stage (post combustion).

2. The Prior Art

Various methods and systems have been known for purification of flue gases from power plants, for a long time.

DE 43 31 415 C3 describes a device for treatment of a flue gas stream with scrubbing fluid in a container, a first spraying device for scrubbing fluid in the upper region of the container, a gas/liquid separation stage disposed below the spraying device, and a second spraying device disposed below the gas/liquid separation stage. The gas/liquid separation stage has at least multiple collection and drain gutters disposed essentially parallel at a distance from one another, which essentially extend more in the gas flow direction. The document describes the structure of an absorber used in general to purify gas, which is used for liquid cleaning of a flue gas.

DE 10 2004 061 727 A1 describes a method for treatment of sulfur dioxide/sulfur trioxide loads in the $CO_2$ stream from a $CO_2$-free power plant according to the oxyfuel process, whereby an additive is added to the $CO_2$ stream. The additive minimizes the harmful effect of sulfur dioxide/sulfur trioxide.

DD 269 893 A1 describes a method and a system for additive suspension for flue gas desulfurization, whereby the suspension treatment is integrated into the flue gas desulfurization system. The additives are pneumatically conveyed into the container situated above the absorber, whereby the conveying air is guided in front of the absorption entry with an additive proportion, in a hot gas stream, and the additive suspension is applied directly to the absorber.

DD 289 211 A5 describes a method for internal sulfite oxidation in wet flue gas desulfurization systems. In the method, the air introduced into the scrubbing suspension is introduced, at least in part, not in a separate oxidation stage, but rather into the connection line between scrubbing suspension conveying pump and distribution device.

In the firing of power plants with fossil fuels, a flue gas stream occurs, which contains not only the harmful substances $SO_2$, HCl, HF, various heavy metals, which must be precipitated out in the method, but also dust particles and mainly carbon dioxide.

Purification of flue gases from power plants fired with fossil fuels, using a scrubbing suspension based on lime/limestone, and with the addition of oxygen into the scrubbing process, to obtain gypsum products that can be used for other purposes, is known.

Scrubbing out the harmful gases from the flue gas, using a lime/limestone scrubbing suspension, takes place in various scrubber systems.

In order to achieve an optimal substance exchange between the flue gas and the scrubbing suspension, not only wet scrubbers, so-called absorbers, having different nozzle-spraying systems without contact installations, but also absorbers having nozzle-spraying systems and, in addition, contact installations having different structures are used. Also absorber systems having only contact installations are used.

For conversion of the sulfite to sulfate, oxygen is introduced, in the form of compressed minuscule air bubbles, either in a separate oxidation container, through which the limestone suspension is passed from the absorber, or, more commonly nowadays, directly into the absorber sump in which the lime/limestone suspension is kept on hand, and dispersed.

In U.S. Pat. No. 5,674,459 A1, a method is described, in which $H_2O_2$ is used as an absorption agent for sulfur oxides and nitrogen oxides, and used as an oxidation agent in place of limestone suspension or lime slurry. The products that occur in the desulfurization process are, at first, $H_2SO_4$ and $HNO_3$. Limestone meal is subsequently used to neutralize the acid that occurs. The absorption agent used is very expensive in comparison with limestone suspension/lime slurry.

U.S. Pat. No. 5,630,991 A describes a method in which ammonium salts are used to increase the limestone meal solubility. The salts must subsequently be removed again, as ammonia, from the suspension that is passed out, in a separate reaction container, by raising the pH up to 11 to 12 with lime slurry.

U.S. Pat. No. 5,213,782 A describes a method in which magnesium oxide and quicklime are used for desulfurization. The separate reaction container that is used has the task of acting as a thickener. For desulfurization, an absorber having a spraying level is used, under which a tray is inserted.

U.S. Pat. No. 5,084,255 A describes a system for purification of flue gas from power plants fired with fossil fuels. The system consists of multiple treatment stages, whereby a suspension with magnesium hydroxide is introduced into an absorber, in the upper region, as an absorption agent added to the raw gas, and an absorption suspension sump is present in the lower region, above which the feed for the raw gas is disposed. In contrast to the method described in the present invention, here the absorber suspension is drawn off directly from the absorber sump, by means of circulation pumps, and introduced into the absorber again in the upper region, by way of spray levels, in a counter-stream to the raw gas. The absorption agent, magnesium hydroxide, which is partly recovered in the regeneration process described below, is introduced directly into the absorber. In contrast to the present invention, therefore, here only a partial stream of the absorber suspension is passed to the oxidation container, and after oxidation, it is completely transferred to the second reaction container, for precipitation with calcium hydroxide to form gypsum.

Removal of the gypsum from the process can take place only after the precipitation reaction, out of the second reaction container. The magnesium hydroxide that forms during the precipitation reaction is passed back to the absorber as an absorption agent. In the present invention, oxidation of the calcium sulfite to form gypsum, in the entire circulated absorber suspension, takes place in the first chamber. It is also passed out there, by way of hydrocyclones. The second chamber serves only as a pump reservoir for the circulation pumps and for metering in absorbents.

In the upper region, the absorber does not have any contact installation level through which raw gas flows and to which a suspension is applied. It is a further disadvantage of this system that multiple separate containers are needed for treatment, which are supplied with a partial suspension stream by way of pumps.

In U.S. Pat. No. 4,687,649, a method is described in which the flue gas is quenched in a first stage, and subsequently, in a second stage, $SO_2$ is precipitated with a limestone meal suspension. For better oxidation of the sulfite to sulfate, here, sulfuric acid is metered in to reduce the pH, in a separate stage, and subsequently, oxidation air is introduced.

In U.S. Pat. No. 2,080,779, a method is described, in which, although a separate oxidation stage is provided, the suspension is passed to the oxidation container by way of a pump, not by way of a direct connection line between absorber and reaction container. The method serves for reducing caked-on material in the absorption and oxidation process.

DE 3136155 A1 describes a method in which a scrubbing suspension is produced from limestone meal and lime slurry. The suspension is passed to a spraying level in a scrubbing tower for desulfurization, by way of a circulation pump, whereby the flue gas flows through a gas/liquid contacting mechanism from top to bottom, in the same stream with the suspension that is nozzle-sprayed in, and leaves the scrubbing tower at the bottom, above the absorber suspension sump. The separate chambers serve for separate metering-in of limestone meal and quicklime or lime hydrate. The absorber suspension from the scrubbing tower flows into a first vessel, having an overflow to a second vessel, whereby a limestone slurry is passed to the first vessel, as an absorbent, but in substoichiometric manner, and in the second vessel, quicklime or slaked lime is added in such an amount that $CO_2$ that forms from the first chamber (carbonic acid) is neutralized to $CaCO_3$. The absorption liquor from the second vessel that forms in this way is passed back to the nozzles of the absorption pipe, into the absorber. A further disadvantage of this prior art is that in both vessels, no feed of oxidation air, for example via a lance, and no exhaust vapor removal are provided, and that the absorption tower functions according to the same-current principle.

In U.S. Pat. No. 5,308,509, a method is described, in which the oxidation of sulfite to sulfate takes place in the absorber sump; a partial stream of this oxidized suspension is passed to the hydrocyclone, and divided up into a gypsum-rich lower run and an upper run that contains the fine particles, flue ash, unreacted absorbent.

In EP 0 339 683 A2, a method is described, in which a partial stream of the absorber suspension has oxidation air applied to it in an oxidation container. Here, magnesium hydroxide is used as an absorption agent. In the oxidation stage, magnesium sulfite is oxidized to sulfate. The other stages serve for gypsum precipitation with lime slurry and for regeneration of the absorption agent, magnesium oxide.

In DE 29 39 744 A1, a method is described, in which chlorine and fluorine compounds are precipitated off in the first absorption stage, and a scrubbing fluid that contains calcium ions is used for the formation of gypsum, in the subsequent $SO_2$ absorption stage. The unique feature here is that a scrubbing fluid with soluble calcium salts is used for the $SO_2$ precipitation. To reduce the chlorine ion content, scrubbing fluid is evaporated to produce crystalline calcium chloride.

In WO 88/07023, a method for catalytic oxidation is described. The method emphasizes catalytic oxidation of sulfites in a separate container, with enzymes as catalysts.

All these systems have in common that the required oxygen is introduced into the process in the form of air, in excess. The oxygen that is not used up, and the other components of the air, as well as the $CO_2$ that is produced during the chemical reaction, get into the flue gas, which is given off into the atmosphere subsequent to the scrubbing process. The nitrogen proportion in the flue gas is further increased by means of the oxidation feed. Furthermore, it is generally not always possible to adjust the pH of the absorption suspension in such a manner that it achieves a maximal effect in the purification process. Furthermore, the desired degree of precipitation and the desired measure of dust removal cannot be achieved with all the known methods.

In the oxyfuel process in power plants, pure oxygen is used for combustion, and a $CO_2$-rich gas with minimal nitrogen content, but concentrated harmful gas contents, is produced. If the $CO_2$-rich gas is freed from harmful gases and harmful substances, the concentrated $CO_2$-rich gas can be compressed directly, for storage.

SUMMARY OF THE INVENTION

Proceeding from a system for purification of flue gases from power plants that work with fossil fuels, according to the oxyfuel process, which consists of multiple absorption stages, and a method for purification of flue gas, it is an object of the invention to remove and avoid contaminants of the $CO_2$-rich gas from the oxyfuel process, for one thing by means of efficient precipitation of the concentrated harmful gases and harmful substances from the flue gas, and for another, by means of avoiding the feed of air as contaminants of the $CO_2$-rich gas into the harmful gas absorption stage. An oxidation air minimization should be achieved by means of oxidation at optimal pH values in the suspension, and better and more cost-advantageous flue gas purification should be achieved by means of an improved process management.

These and other objects are achieved according to one aspect of the invention by a system for purification of flue gases from power plants fired with fossil fuels, particularly power plants that function according to the oxyfuel process, consisting of multiple absorber stages. The system has an absorber having a line for the pure gas in the absorption hood. In the upper region of the absorber at least one contact installation level to which suspension is applied is disposed. Through this level the raw gas flows. The lower region of the absorber has an absorption suspension sump, above which the inflow for the raw gas is disposed. Oxidation air is introduced into the absorber suspension in a separate reaction container. The absorber sump of the absorber stands in connection with the separate reaction container. In the lower region of the separate reaction chamber is disposed an opening for passing out suspension with a line to a separation device. The system has another suspension container, and a hydrocyclone is provided as the separation device.

The absorber has at least one contact installation to which suspension is applied, in the upper region, through which raw gas flows.

The separate reaction container consists of two separate chambers separated by a partition wall with overflow, in the first chamber of which oxidation air is introduced into the absorber suspension by means of a lance. The absorption sump of the absorber stands in connection with the first chamber of the separate reaction container by means of a pipeline, which is connected with the hydrocyclone by means of an opening in the lower region, for passing out suspension by means of a line. From the upper run of the hydrocyclone, lines lead both to the first chamber and to the limestone suspension container.

The second chamber of the separate reaction container stands in connection with the limestone suspension container.

A gas exhaust hood is disposed above the two chambers of the separate reaction container, which hood draws off the exhaust vapor into an exhaust vapor hood.

A line for suspension is disposed between at least one spraying level of the absorber and the second chamber of the separate reaction container.

A feed for process water to a purification level is disposed above and below at least one droplet precipitator level and above the installation level and the spraying level.

In another aspect, these and other objects are achieved according to the invention by a method for purification of flue gas from power plants fired with fossil fuels in the system described above.

In the multi-stage absorption method according to the invention, the raw gas to be purified flows through at least one installation level to which suspension is applied in the absorber, in a first purification stage, counter to the suspension direction.

The acidic suspension that occurs in the absorption suspension sump is passed to the first chamber of the reaction container and treated with oxidation air, so that in a first stage, calcium sulfite is oxidized to form calcium sulfate, whereby suspension is drawn off in the lower region.

The remaining suspension gets into the second chamber by means of flowing over the partition wall.

Fresh limestone is passed to the second chamber, and the product of the second stage is passed to at least one spraying level of the absorber, as absorption suspension.

The $CO_2$ driven out in the first chamber of the reaction container, by means of the oxidation with oxidation air, and the excess oxidation air are drawn off from the reaction container and treated separately.

The treated raw gas, after the spraying level, is passed to a droplet precipitator level and to a purification level, before it leaves the absorber.

Advantageous embodiments of the invention are discussed below.

The system according to the invention, for purification of flue gas, consists of multiple absorption stages, in which raw gas is passed into the absorber. In the upper region of the absorber, contact installations are provided, to which suspension is applied, whereby the contact installations or installation levels have raw gas flowing through them. The installation levels are gas-permeable and can represent sieves, perforated panels or metal sheets, or other suitable installations.

It is advantageous if the contact installations represent one perforated metal sheet or multiple, preferably two, perforated metal sheets. Dust precipitation in the absorber or spray tower is improved by means of the perforated metal sheets, because the flue gas velocity in the bores of the perforated metal sheets is significantly higher than the speed in front of the spraying levels.

The absorption suspension, which runs off counter to the flue gas stream, through the bottommost perforated metal sheet, and is finely distributed because of the higher flow speed of the flue gas in the bores, is collected in the absorption sump, which is situated in the lower part of the absorber. A stirring mechanism, for example a slanted stirring mechanism, can be advantageously disposed in this part. From the absorption sump, a line leads to a separate reaction container, which consists of two chambers that are formed using a partition wall with an overflow. Absorption suspension from the sump flows into the first chamber, which is then separated, in gastight manner, from the absorber. In this first chamber of the reaction container, oxidation air is introduced by way of a pipeline, preferably a lance, by means of a blower.

A corresponding dimensioning of the connection line between absorber and reaction container prevents undesirable gas back-flow and thus contamination of the $CO_2$-rich gas by means of air entry into the absorber. This arrangement represents a simple sealing possibility, by means of targeted discharge of suspension into the reaction container. Oxidation of the calcium sulfite to produce gypsum takes place by means of the introduction of the oxidation air into the absorption suspension, and driving out $CO_2$ by means of the air ensures optimal limestone solubility in the second chamber of the reaction container. For better mixing, it is advantageous to provide a stirrer, for example a slanted stirrer. Because the suspension is not enriched with limestone, it has a lower pH than the suspension in the second reaction chamber. This difference in pH is advantageous, because suspension for a solid/liquid separation is drawn off at the bottom of the first reaction chamber, by way of a pump, which separation should advantageously take place in a hydrocyclone.

Drawing off the suspension from the first chamber takes place by means of a hydrocyclone pump. The hydrocyclone separates a gypsum suspension and a thinner liquid that is passed back to the first chamber, but can also be passed to a limestone suspension container.

To the extent that the liquid level in the absorber rises, the liquid level in the first chamber of the reaction container rises, too. As a result, suspension runs over into the second chamber of the reaction container. A limestone suspension is introduced into this chamber, and mixed by means of a stirrer.

The suspension in the second reaction chamber has a higher pH, due to introduction of the limestone suspension, so that the absorption suspension passed out of this chamber into the absorber can have a more intensive effect on the harmful gas precipitation. The absorption suspension is passed, by means of lines, to the spraying levels in the absorber, which are disposed above or partly between the contact installations, preferably the perforated metal sheets. It has proven to be advantageous to dispose a spraying level above the lowermost perforated metal sheet, and two spraying levels above the perforated metal sheet situated above it. Into these levels absorption suspension from the second chamber of the reaction container can be introduced.

According to the invention, the $CO_2$ that has formed in the reaction container and the excess oxidation air in the reaction container are separately removed from the process, and therefore contamination of the $CO_2$-rich gas is avoided in the oxyfuel process. As a result, gastight separation of flue gas and oxidation air is also achieved. This separation and removal can advantageously take place by way of an exhaust vapor hood. The gas drawn off can be passed to purification separately. It is advantageous to also use the exhaust vapor hood to draw off the gases that form in the lime/limestone suspension container. The limestone suspension container serves to produce a limestone suspension. Lime/limestone meal is introduced into the process fluid from a supply container, preferably a silo having a metering device. A screw conveyor is suitable as a metering device. It is advantageous if a stirring mechanism is disposed in the lime/limestone suspension container, which assures thorough mixing of lime/limestone meal and process water without upper run.

The limestone suspension is conveyed into the second chamber of the reaction container by means of a limestone suspension pump.

In the upper part of the absorber, droplet precipitator levels are disposed, which lie above the contact installations, i.e. the perforated metal sheets. These droplet precipitator levels can be fine-precipitation or coarse-precipitation levels.

The coarse droplet precipitation level is disposed below the fine droplet precipitation level, and all the levels are provided with purification levels, by way of which process water is introduced into the upper part of the absorber, and the purified flue gas leaves the absorber by way of the absorber hood.

Oxidation of the sulfite to sulfate is improved by means of the introduction of oxidation air into the first stage of the reaction container, in which the reaction agent limestone is used up, to a great extent. Precipitation of $SO_2$ from the flue gas is improved by means of the introduction of fresh limestone suspension directly into the second stage of the reaction container, which serves as a source for the scrubbing suspension for the spraying levels.

A uniform velocity distribution is achieved, already ahead of the spraying levels, by the use of the perforated metal sheet as a contact installation or multiple perforated metal sheets disposed one behind the other for flue gas purification. To the sheet or sheets suspension is applied from the spraying levels that lie above the sheet or sheets. This structure of the absorber makes it possible to achieve precipitation degrees of over 99% even at high sulfur dioxide contents.

Improved dust precipitation in the spraying tower is also achieved by means of the use of perforated metal sheets for flue gas purification, to which suspension is applied from the spraying levels that lie above them.

Furthermore, additional precipitation levels are produced by means of the use of one or more perforated metal sheets for flue gas purification disposed one behind the other, to which suspension is applied from the spraying levels that lie above them, without an additional energy requirement for pumping the scrubbing suspension in circulation being needed.

Furthermore, the excess oxidation air is drawn off from the reaction container, and the $CO_2$ that is driven out is drawn off, and purified separately, and passed out of the process, or passed back to the purified flue gas after purification.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawing,

The sole FIGURE shows an embodiment variant of the system according to the invention.

DETAILED DESCRIPTION OF PREFERRED EMBODIMENTS

The system for purification of flue gas from fossil fuels, according to the invention, consists essentially of an absorber 2, the correspondingly dimensioned connection line to the reaction container, the reaction container 4, consisting of two chambers 4.1, 4.2, next to which a lime or limestone suspension container 6 is situated, on the same level, above which a lime or limestone silo 8 for lime or limestone meal 16 is disposed, whereby the metering device 9, a metering screw, meters lime or limestone meal 16 into the limestone suspension container 6. Process water 15 is introduced into the container, and the stirring mechanism 17 ensures uniform, thorough mixing. A line that forms the inflow 24 to the hydrocyclone leads from first chamber 4.1 of reaction container 4 to the hydrocyclone 26, with which gypsum suspension 27 is precipitated. The thin-liquid suspension is pumped back to first chamber 4.1 or to lime or limestone suspension container 6 in lines 25 for the upper run of hydrocyclone 26.

In order to be able to draw off the suspension, a hydrocyclone pump 23 is disposed in front of hydrocyclone 26. Lines 13 for the limestone suspension lead from lime or limestone suspension container 6 containing the lime or limestone suspension 33 to second chamber 4.2 of reaction container 4, whereby a circulation pump 7 for limestone suspension is disposed in these lines 13.

In the lower part of absorber 2, there is the absorption suspension sump 30, into which a slanted stirring mechanism 17 projects, and from which pipelines 11 for the absorption suspension lead to reaction container 4. Above absorption suspension sump 30, the raw gas 1 is issued into absorber 2. Above this location, two perforated metal sheets 18 are disposed, between which the first spraying level 19 is situated, whereby two additional spraying levels 19 are disposed above the second perforated metal sheet 18. Lines for the absorption suspension 12 lead to the lower spraying levels 19, on which lines a circulation pump 5 is situated, and which lines are connected with second chamber 4.2 of reaction container 4. Above spraying level 19, purification levels 32 are disposed, between which the precipitator level 20 for coarse droplets and the precipitator level 31 for fine droplets are situated, above which the absorber hood 34 for pure gas 3 is disposed. The purification levels 32 have process water 15 applied to them.

A blower 21 serves for introduction of the oxidation air 22 into the absorption suspension, from which blower a line leads to the lance 28 that is disposed in first chamber 4.1 of reaction container 4. An exhaust vapor blower is disposed above the two reaction chambers 4.1, 4.2, and lime/limestone suspension container 6, with which the exhaust vapor hood 14 draws off exhaust vapors by means of a blower 10.

The raw gas 1 to be purified enters into absorber 2 and changes its flow direction upward after entering, and distributes itself uniformly over the absorber cross-section. Afterwards, it flows through a system of contact installations such as perforated metal sheets 18 and three spraying levels 19 equipped with the spray nozzles. These contact installations have circulating absorption and limestone scrubbing suspension applied to them. Pure gas 3 purified in this manner subsequently passes through the upper part of absorber 2, droplet precipitator levels 20, 31, whereby the entrained droplets are effectively precipitated, and leaves absorber 2 through absorber hood 34.

The lower part of absorber 2, with absorption suspension sump 30, is connected with the two-part reaction container 4 by means of pipeline 11. The two-part division of reaction container 4 takes place by means of a partition wall 29, which represents an overflow. In both chambers 4.1, 4.2 of reaction container 4, stirring mechanisms 17 are disposed, which serve for suspension and dispersion. By means of a lance 28, oxidation air 22 is introduced into first chamber 4.1. The task of this oxidation air 22 consists in introducing an amount of air into the suspension that is independent of load, in order to oxidize the calcium sulfite that is formed during the $SO_2$ precipitation, to form calcium sulfate. The amount of compressed air 22 that is required for oxidation is independent of the $SO_2$ load and is made available by the blower 21. A suspension is drawn off from the first chamber 4.1, and gypsum suspension 27 is precipitated by means of hydrocyclone 26.

Second chamber 4.2 of reaction container 4 serves as a pump reservoir for the circulation pump 5 of the absorption suspension, which supplies spray levels 19 in absorber 2 that have been described. Second chamber 4.2 is equipped with a vertically disposed stirring mechanism 17 for suspension.

An overflow from first chamber 4.1 of reaction container 4 into second chamber 4.2 ensures quiet feed and degasification of the excess oxidation air 22 from the suspension and from this container part. Both container parts 4.1, 4.2 are vented by means of an exhaust vapor hood with an integrated droplet precipitator, which is disposed centrally on the container roof. The gas that is drawn off, which consists predominantly of oxidation air and $CO_2$, is purified by the droplet precipitator and passed off separately, by way of the exhaust vapor blower 10. The $CO_2$ contained in it can be separated in a further method step.

The invention has the advantage that contaminants of the $CO_2$-rich gas (flue gas from the oxyfuel process) are removed and avoided for one thing by efficient precipitation of the concentrated harmful gases and harmful substances from the flue gas, and for another, by avoiding the introduction of air into the harmful gas absorption stage, whereby the oxidation can take place at lower pH values by separation of the oxidation from the limestone metering, and therefore improved process management, improved and more cost-advantageous flue gas purification is achieved.

Although only a few embodiments of the present invention have been shown and described, it is to be understood that many changes and modifications may be made thereunto without departing from the spirit and scope of the invention.

What is claimed is:

1. A system for purification of flue gases from a power plant fired with fossil fuels comprising
   (a) an absorber having an upper region and a lower region, said absorber comprising an absorber hood, a line for pure gas in the absorber hood, at least one contact installation level comprising at least one spraying level disposed in the upper region wherein an absorber suspension is applied to the at least one contact installation level and raw gas flows through the at least one contact installation level, at least one purification level, at least one droplet precipitator level, an absorption suspension sump disposed in the lower region, and an inflow for raw gas disposed above the absorption suspension sump;
   (b) a separation device comprising a hydrocyclone;
   (c) a separate reaction container comprising separate first and second chambers and a partition wall with overflow separating the first and second chambers, a lance disposed in the first chamber for introducing oxidation air into the absorber suspension in the first chamber, and an opening in a lower region of the first chamber for discharging the absorber suspension through a discharge line to the hydrocyclone;
   (d) a pipeline connecting the absorption suspension sump with the first chamber;
   (e) an absorption suspension container connected to the second chamber;
   (f) lines leading from the hydrocyclone to the first chamber and to the absorption suspension container;
   (g) a gas exhaust hood disposed above the first and second chambers for drawing off exhaust vapors into an exhaust vapor hood;
   (h) a suspension line for the absorption suspension disposed between the at least one spraying level and the second chamber; and
   (i) a feed for process water to the at least one purification level disposed above and below the at least one droplet precipitator level and above the at least one installation level.

2. The system according to claim 1, wherein the at least one contact installation level in the absorber comprises at least one perforated metal sheet with the at least one spraying level disposed above the at least one perforated metal sheet.

3. The system according to claim 2, wherein the at least one droplet precipitator level comprises a coarse droplet precipitator level and a fine droplet precipitator level above the at least one perforated metal sheet and the at least one spraying level.

4. The system according to claim 1, wherein the gas exhaust hood comprises a blower for exhaust vapors disposed in front of the exhaust vapor hood, said blower drawing off the exhaust vapors of the reaction container and of the absorption suspension container.

5. The system according to claim 1, further comprising first and second stirring mechanisms disposed in the first and second chambers of the reaction container, a third stirring mechanism disposed in the absorption suspension sump, and a fourth stirring mechanism disposed in the absorption suspension container.

6. The system according to claim 1, further comprising a plurality of circulation pumps disposed in the suspension line and a delivery line for delivery of the absorption suspension to the reaction container.

7. The system according to claim 1, further comprising a blower for feed of the oxidation air into the reaction container.

8. The system according to claim 6, wherein the circulation pumps have regulated speeds of rotation to optimize energy.

9. A method for purification of flue gas from a power plant fired with fossil fuels comprising the steps of:
   (a) causing raw gas to be purified in a first purification stage to flow through at least one installation level comprising at least one spraying level in an absorber of a system for purification of the flue gas counter to a direction of application of an absorption suspension to the at least one installation level, the absorption suspension thereafter entering an absorption suspension sump;
   (b) passing an acidic suspension formed from the absorption suspension in the absorption suspension sump to a first reaction chamber of a separate reaction container;
   (c) treating the acidic suspension with oxidation air so that in a first stage calcium sulfite is oxidized to form calcium sulfate and a first suspension is drawn off in a lower region of the first reaction chamber and a second suspension flows over a partition wall into a second reaction chamber of the separate reaction container, the second reaction chamber being separated from the first reaction chamber by the partition wall;
   (d) passing fresh limestone suspension into the second reaction chamber;
   (e) passing absorption suspension formed in a second stage to the at least one spraying level;
   (f) drawing off carbon dioxide discharged from the first reaction chamber via oxidation with the oxidation air and excess oxidation air from the reaction container for separate treatment; and
   (g) passing the raw gas treated in the first purification stage to a droplet precipitator level before the raw gas leaves the absorber.

10. The method according to claim 9, wherein the at least one installation level comprises at least one perforated metal sheet and the at least one spraying level has at least one injection level above the at least one perforated metal sheet.

11. The method according to claim 9, wherein the first suspension is withdrawn from the first reaction chamber, in the lower region, separated from a gypsum suspension, and discharged, and remaining liquid is passed to at least one of the first reaction chamber and a lime/limestone suspension container.

12. The method according to claim 9, wherein exhaust vapors are passed for treatment in a purification process.

* * * * *